(12) United States Patent
Roukes

(10) Patent No.: US 8,487,385 B2
(45) Date of Patent: Jul. 16, 2013

(54) UNCOOLED IR DETECTOR ARRAYS BASED ON NANOELECTROMECHANICAL SYSTEMS

(75) Inventor: Michael L. Roukes, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 903 days.

(21) Appl. No.: 12/536,036

(22) Filed: Aug. 5, 2009

(65) Prior Publication Data

US 2010/0096709 A1   Apr. 22, 2010

Related U.S. Application Data

(60) Provisional application No. 61/137,939, filed on Aug. 5, 2008.

(51) Int. Cl.
   *H01L 29/66*   (2006.01)
(52) U.S. Cl.
   USPC ....... 257/414; 257/24; 257/E29.166; 977/902
(58) Field of Classification Search
   USPC ........................... 257/414, E29.166; 977/902
   See application file for complete search history.

(56) References Cited

U.S. PATENT DOCUMENTS

2002/0166962 A1* 11/2002 Roukes et al. ................ 250/306
2005/0273824 A1* 12/2005 Matic .............................. 725/80
2008/0136563 A1*  6/2008 Duwel et al. .................. 333/186

* cited by examiner

*Primary Examiner* — Lynne Gurley
*Assistant Examiner* — Vernon P Webb
(74) *Attorney, Agent, or Firm* — Milstein Zhang & Wu LLC; Joseph B. Milstein

(57) ABSTRACT

We describe the use of a high-quality-factor torsional resonator of microscale dimensions. The resonator has a paddle that is supported by two nanoscale torsion rods made of a very low thermal conductivity material, such as amorphous ("a-") silicon. The body of the torsion paddle is coated with an infrared-absorbing material that is thin and light weight, but provides sufficient IR absorption for the applications. It may be placed above a reflecting material of similar dimensions to form a quarter wave cavity. Sensing of the response of the paddle to applied electromagnetic radiation provides a measure of the intensity of the radiation as detected by absorption, and the resulting temperature change, in the paddle.

20 Claims, 6 Drawing Sheets

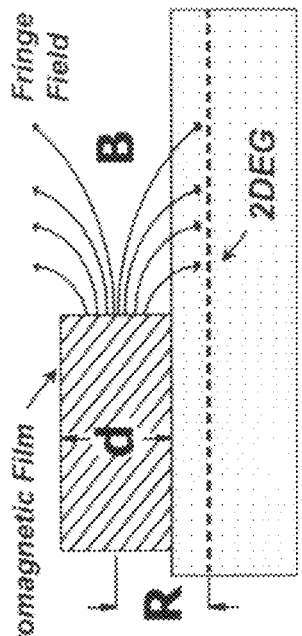
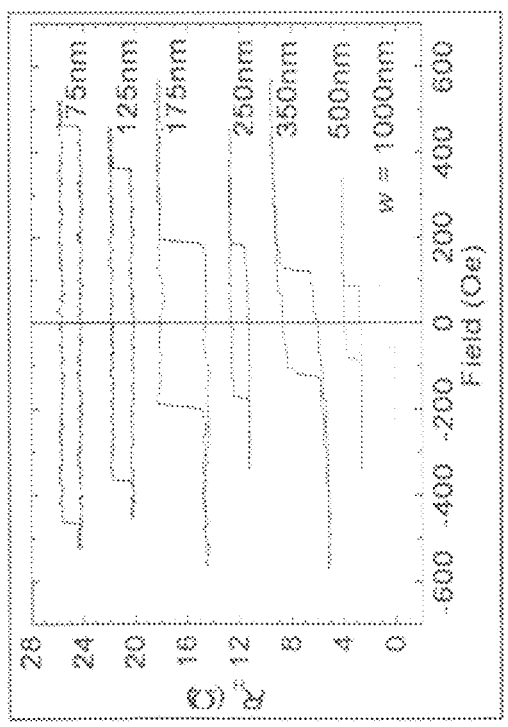
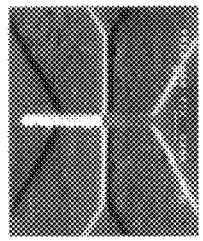
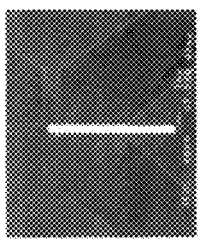
FIG. 3C
FIG. 3B
FIG. 3A

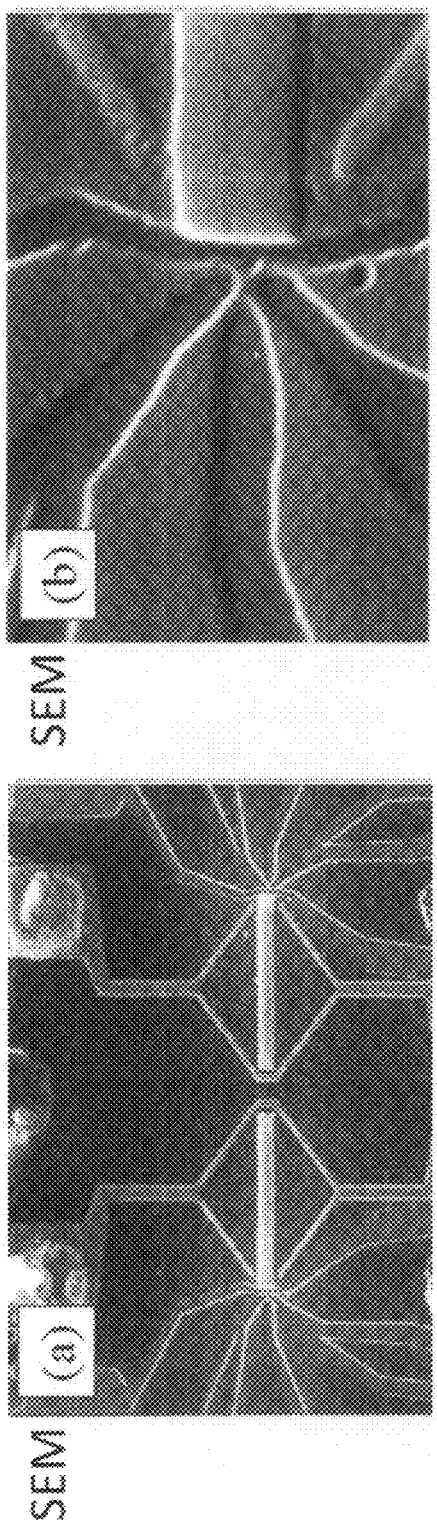
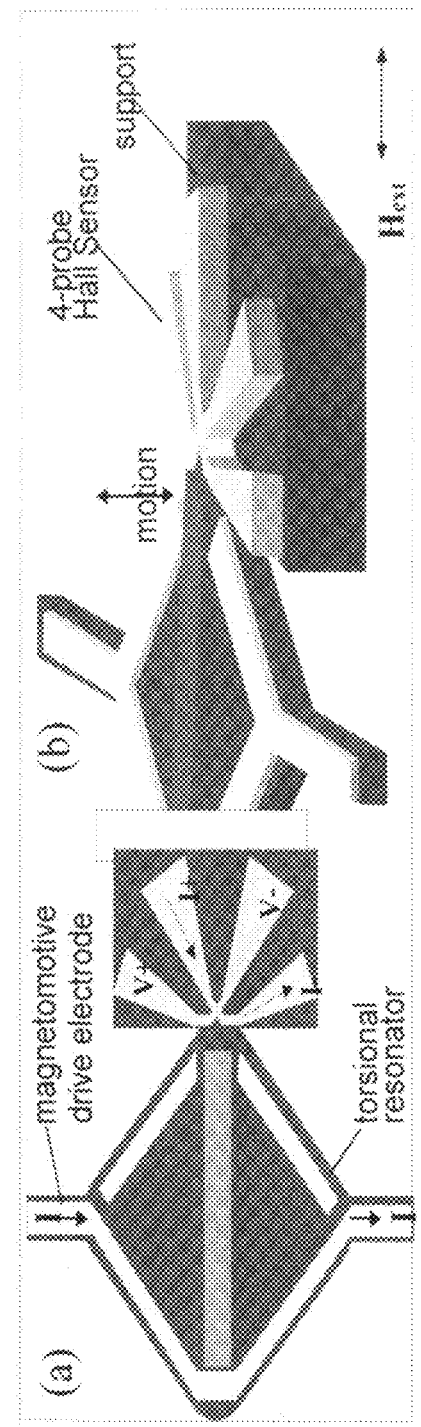
FIG. 4A
FIG. 4B

UNCOOLED IR DETECTOR ARRAYS BASED ON NANOELECTROMECHANICAL SYSTEMS

CROSS-REFERENCE TO RELATED APPLICATIONS

This application claims priority to and the benefit of co-pending U.S. provisional patent application Ser. No. 61/137,939, filed Aug. 5, 2008, which application is incorporated herein by reference in its entirety.

FIELD OF THE INVENTION

The invention relates to thermal detectors in general and particularly to infrared detectors that operate at ambient temperatures.

BACKGROUND OF THE INVENTION

Temperature sensing using cooled detectors, such as those made of such as those based on mercury-cadmium-telluride materials or those based on superconducting materials, has been known for some time.

Temperature sensing systems based on quartz resonators that operate at ambient temperatures have been described by Vig in various patents, including U.S. Pat. Nos. 5,686,779 and 5,744,902. Vig teaches the use of quartz crystals cut at specific orientations. In particular, Vig explains that, since quartz is anisotropic, crystal cut orientations can be found to minimize, or alternatively, to selectively increase sensitivity to temperature.

There is a need for an ambient temperature sensing system that is more sensitive than existing systems.

SUMMARY OF THE INVENTION

According to one aspect, the invention relates to a nanoelectromechanical sensing element. The nanoelectromechanical sensing element comprises a substrate having a surface, the substrate comprising an isotropic material, the surface having defined therein a cavity for accommodating a nanoelectromechanical structure; a nanoelectromechanical torsional resonator having a width w and a length l, and having a torsional support connecting a first side and a second side of the nanoelectromechanical torsional resonator to the substrate, the nanoelectromechanical torsional resonator, configure to receive electromagnetic radiation as a stimulus, the nanoelectromechanical torsional resonator and the torsional support configured to provide an oscillation of the nanoelectromechanical torsional resonator at a predetermined frequency; and a displacement sensor configured to sense a displacement of the nanoelectromechanical torsional resonator relative to the substrate and configured to provide an output signal. When a stimulus is received by the nanoelectromechanical torsional resonator, the displacement sensor provides an output signal indicative of a parameter of the stimulus.

In one embodiment, the isotropic material is amorphous silicon. In one embodiment, the width w is 10 microns and the length l is 20 microns.

In one embodiment, the stimulus is a thermal signal. In one embodiment, the thermal signal is an infrared signal. In one embodiment, the nanoelectromechanical sensing element further comprises a material configured to absorb thermal radiation disposed on the nanoelectromechanical torsional resonator. In one embodiment, the cavity defined in the surface of the substrate is configured to provide a quarter wave cavity. In one embodiment, the cavity comprises a reflector. In one embodiment, the thermal signal is a signal selected from the group consisting of gamma rays, x-rays, ultraviolet light, visible light, microwave energy and millimeter wave energy.

In one embodiment, the displacement sensor is a Hall displacement sensor.

In one embodiment, the stimulus is a chemical signal, and the nanoelectromechanical torsional resonator comprises a material configured to respond to a chemical signal. In one embodiment, the chemical signal is a molecule. In one embodiment, the material configured to respond to a chemical signal is a molecule.

In one embodiment, the substrate has defined therein a plurality of cavities for accommodating a nanoelectromechanical structure.

In one embodiment, the nanoelectromechanical sensing element further comprises a first plurality of nanoelectromechanical torsional resonators, each nanoelectromechanical torsional resonator having a width w and a length l, and each having a torsional support connecting a first side and a second side of the nanoelectromechanical torsional resonator to the substrate, and a second plurality of displacement sensors, at least one of the plurality of displacement sensors configured to sense a displacement of a respective one of the plurality of nanoelectromechanical torsional resonators relative to the substrate and configured to provide an output signal indicative of a stimulus applied to the nanoelectromechanical torsional resonator. In one embodiment, the first plurality is equal to the product N×M, where N and M are integers. In one embodiment, the N×M nanoelectromechanical torsional resonators are configured each to receive an infrared stimulus. In one embodiment, the sensing element is configured to provide as output an image. In one embodiment, the image is configured in an HDTV format.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 3 is a diagram illustrating how one can sense single domain nanomagnets using Hall methods.

FIG. 4 is a diagram showing the Hall sensing geometry in greater detail.

DETAILED DESCRIPTION

Nanoelectromechanical systems (NEMS) provide an opportunity to construct systems and devices that provide useful functions which cannot conveniently be attained in more conventional macroscopic systems.

We describe a new method for achieving sensitive infrared (IR) detection based on temperature-induced frequency shifts to a mechanical resonator. The local temperature rise of the resonator is induced by the absorption of radiation. This concept can form the basis for individual bolometers, or subsequently assembled—for example—to populate an infrared focal plane array for imaging applications.

Figure 1:
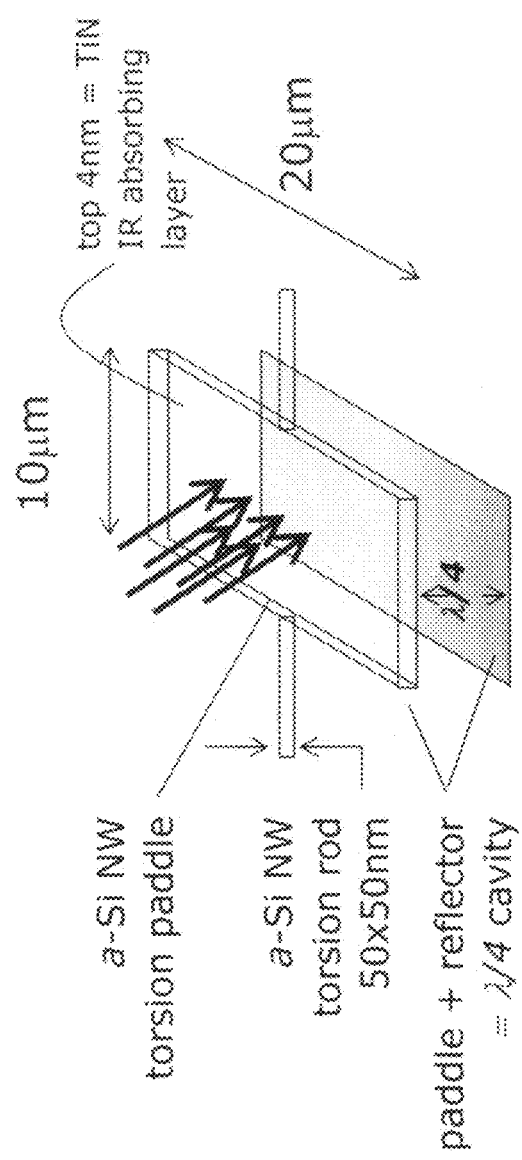
FIG. 1 is a perspective view of a single NEMS torsional bolometer unit, according to principles of the invention.

Turning to FIG. 1, we describe the use of a high-quality-factor torsional resonator of microscale dimensions. The embodiment of FIG. 1 comprises a paddle that is supported by two nanoscale torsion rods made of a very low thermal conductivity material, such as amorphous ("a-") silicon. Amorphous silicon is of interest because it has quite low thermal conductivity. As distinct from crystalline quartz, amorphous silicon does not have specific crystalline orientations, and would not be expected to exhibit anisotropies similar to those exhibited by crystalline quartz. In a preferred embodiment, the body of the torsion paddle is coated with an infrared-absorbing material that is thin and light weight, but provides sufficient IR absorption for the applications. It may be placed above a reflecting surface of similar dimensions to form a quarter wave cavity.

In the embodiment shown in FIG. 1, a nanowire torsional rod comprising amorphous silicon (also referred to as "a-silicon" or "α-silicon") is used to support a paddle comprising a-silicon. The nanowire torsional rod is expected to provide a support having minimal thermal conductance, thereby increasing the thermal sensitivity of the bolometer. The paddle is expected to have dimensions of approximately 10 μm width by approximately 20 μm length, with the a-silicon torsional rod supporting the paddle at the midpoint of its length dimension. The a-silicon torsional rod is expected to have a cross sectional dimension of approximately 50 nm by 50 nm. The length of the torsional rod is expected to extend approximately 1 μm out from each side of the paddle and to support the paddle by connecting to a substrate having an aperture designed to accommodate the paddle. In some embodiments, the substrate that supports the paddle has defined therein a cavity or a void, for example a cavity long enough and wide enough to allow the paddle to move rotationally on the a-silicon torsional rod without interference. In some embodiments, the cavity has a depth calculated to be of the order of ¼ of the wavelength of the infrared electromagnetic radiation that the paddle is designed to respond to, and to have disposed on the surface of the substrate at the "bottom" of the cavity a reflector, so as to provide a ¼ wavelength (¼λ) reflector. For 10 μm radiation, for example, this would involve a 2.5 μm spacing between a reflector affixed to the substrate and the paddle. A suitable reflector can be a layer of a metal such as gold, a series of layers of optical materials calculated to reflect in the wavelength range of interest, or a compound having suitable reflective properties. The paddle can be coated on one side, for example the side that will receive electromagnetic radiation (such as infrared radiation) from an external source, with a material such as titanium nitride (TiN) that increases the absorption of the received electromagnetic radiation. In some embodiments, the layer of TiN is of the order of 4 nm thick. In FIG. 1, the arrows pointing to the "top" (or exposed) surface of the bolometer are intended to denote the illumination of the exposed surface with electromagnetic radiation.

Resonant RF NEMS Bolometer Comprising Pixels

In one embodiment, the resonator is a high-Q torsional resonator operating in the vicinity of 10 MHz, and having a Q>100,000 in vacuo, and an Allan Deviation, $\sigma_A$, of the order of $10^{-7}$. The Allan Deviation is a non-classical statistic used to estimate stability.

The bolometer operates using the temperature dependence of its resonance in order to detect absorbed radiation. The temperature coefficient, TC, of the resonant frequency is given by $$TC = [1/f_0][\partial f_0/\partial T]$$

and is expected to have as a value TC~10,000 ppm/K (or 10,000 parts per million per Kelvin).

The responsivity, $\Re$ f, is given by $$\Re f = \frac{\delta f_o}{\delta P} = \frac{(\partial F_o/\partial T)\delta T}{G\delta T} = \frac{1}{G}\frac{\partial f_o}{\partial T} = \frac{f_o TC}{G}.$$

We will use the values $f_O$~10 MHz and TC~10,000 ppm/K in the following derivations.

We will estimate G under the assumption that the torsional rod support is made from pure a-silicon. We have $$\kappa(T=300\ K)|_{a-Si}\sim 0.25\ W/(K\cdot m)$$

The torsion rod cross section is given by $$A=(5\times 10^{-8}\ m)^2=2.5\times 10^{-15}\ m^2$$

The torsion rod length l=1 μm=1×10⁻⁶ m. Thus an estimate for G is $$G=\kappa A/l\sim (0.5\ W/(K\cdot m))\cdot(2.5\times 10^{-15}\ m^2)/(1\times 10^{-6}\ m)\sim 1.25\times 10^{-9}\ W/K$$

An estimate for $\Re$ f is $$\Re f = \frac{f_o TC}{G} = (10\ MHz)\cdot(10{,}000\ ppm/K)/(1.25\times 10^{-9}\ W/K) \sim 8\times 10^{13}\ Hz/W$$

Noise equivalent power (NEP) for frequency shift detection is defined as $$NEP|_{f_O} = <\delta f^2>^{1/2}/\Re f \sim 2\sqrt{2}\sigma_A f_O/\Re f$$

The noise equivalent power (NEP) is a measure of the minimum thermal power detectable by the IR bolometer, and is set by the noise processes of the detector (both intrinsic and extrinsic). In order to project the ultimate performance of our IR bolometers, it proves illuminating to classify the noise contributions into two terms—one term that broadly reflects the noise sources typically found in NEMS operated for frequency-shift detection, and a term that, while typically ignored in our previous NEMS application efforts, becomes significant for these unique structures. The first of these terms, which we will call NEP|$_{f0}$, can be parametrized in terms of the typical fractional frequency fluctuations, or Allan deviation $\sigma_A$, during a frequency-shift measurement of a NEMS device. The origins of these fluctuations are manifold, from thermomechanical noise to transduction and amplifier contributions. For NEMS resonators operating at room temperature in atmospheric pressure, we have achieved $\sigma_A < 10^{-6}$, while for cryogenically-cooled NEMS in UHV conditions, we have realized Allan deviations approaching $\sigma_A \sim 10^{-8}$. Assuming a median Allan deviation of $\sigma_A < 10^{-7}$, we derive NEP|$_{f0}$ from $$NEP|_{f_0} = \frac{2\sqrt{2}\ \sigma_A f_0}{\Re} = \frac{2\sqrt{2}\times(10^{-7})\times 10\ MHz}{8\times 10^{13}\ Hz/W} = 35.4\ fW.$$

The second noise term comes from the extreme thermal isolation of the paddle from its environment, which results in thermodynamic fluctuations of the resonator's temperature. For a small body thermally isolated from its environment, the temperature noise power due to thermal fluctuations is $$S_{\delta T}(\omega) = \frac{4k_B T^2}{G} \frac{1}{1+(\omega \tau_{th})^2}.$$

We assume that our noise integration bandwidth $\Delta\omega$) is maximal, meaning we integrate up to the thermal time constant roll-off. Thus the total thermal noise power in our measurement bandwidth can be estimated, and then converted into the noise equivalent power NEP|$_{TF}$ using the thermal conductance, like so:

$$NEP|_{TF} \sim G \times \sqrt{S_{\delta T}(\omega=0) \times \Delta\omega} = \sqrt{\frac{4Gk_B T^2}{\tau_{th}}} = 660 \text{ fW}.$$

The total noise equivalent power is thus determined by adding the two noise terms in quadrature:

$$NEP|_{tot} \sim \sqrt{(NEP|_{fo})^2 + (NEP|_{TF})^2} = 661 \text{ fW}.$$

As can be seen, thermal fluctuation is expected to be the dominant noise source for our IR bolometers.

Finally, the noise equivalent temperature difference (NETD) can be determined. The NETD is defined as the minimum detectable temperature difference of a target relative to its environment; thus it not only depends on intrinsic properties of the detector, but also how the target radiation is delivered to the detector. The amount of power received by an IR detector $\delta P_t$ can be related to the temperature difference $\delta T_t$ of a target relative to its surroundings (assuming classic blackbody radiation) in the following formula:

$$\delta P_t = \frac{\alpha_0 A_d}{4F^2} \left(\frac{dP}{dT}\right)_{\lambda_1,\lambda_2} \delta T_t$$

Here $\alpha_o$ is the absorption efficiency of the detector, $A_d$ the detector capture area, F the f-number of the supporting optics of the detector system, and dP/dT is the variation of blackbody power with temperature at the background temperature, within the IR wavelength band set by $\lambda_1$ and $\lambda_2$. We will assume typically-realizable numbers for these parameters: $\alpha_o$=0.9, F=1.0, and, for a medium IR band of 8-14 μm, dP/dT=2.62 W/m$^2$·K. Inserting these numbers, we have $$\delta P_t = \frac{0.9 \times 200 \text{ μm}^2}{4}(2.62 \text{ W/m}^2 \cdot K)\delta T_t = (118 \text{ pW/K}) \times \delta T_t$$

We can then directly determine the NETD by combining this with the previously-derived NEP:

$$NETD = \frac{NEP|_{tot}}{\frac{\delta P_t}{\delta T_t}} = \frac{661 \text{ fW}}{118 \text{ pW}} \cdot K = 5.6 \text{ mK}.$$

We can estimate a thermal time constant, $\tau_{th}$, as $$\tau_{th} = C_{tot}(T)/G$$

The components of $C_{tot}$ include, for 50 nm thick a-silicon having an area of 10 μm×20 μm, $$C_{a\text{-}Si}(T=300 \text{ K})=(1.6\times10^6 \text{ J/K·m}^3)\cdot(2.5\times10^{-18} \text{ m}^3)=4.0\times10^{-12} \text{ (J/K)}$$

For 4 nm thick TiN (also with an area of 10 μm×20 μm)

$$C_{TiN}(T=300K)=(2.3\times10^{6} \text{ J/K·m}^3)\cdot(2.5\times10^{-18} \text{ m}^3)=5.8\times10^{-12} \text{ (J/K)}$$

We then estimate $\tau_{th}$ as $$\tau_{th} = (C_{a\text{-}Si} + C_{TiN})/G$$
$$= [4.0\times10^{-12}(J/K) + 5.8\times10^{-12}(J/K)]/(1.25\times10^{-9}) \sim 14.3 \text{ ms}$$

The Figure of Merit (FOM) typically quoted is

FOM=NETD×$\tau_{th}$=(5.6 mk)(14.3 ms)=80 mK·msec

This FOM is about 3 to 5 times better than that for current state of the art uncooled detectors.

Figure 2:
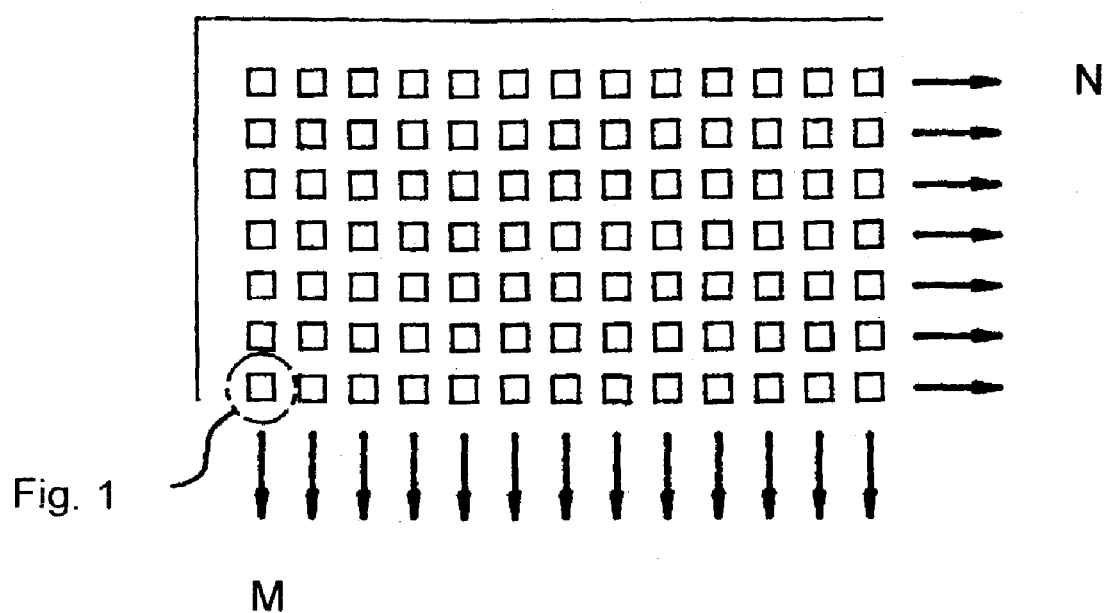
FIG. 2 is a schematic diagram illustrating an N by M array of torsional bolometer units of FIG. 1.

It is expected that one can attain high areal packing densities using NEMS processing technology. For example, all the pixels of a detector sufficient to provide an image for HDTV are expected to be fabricated on a single chip. FIG. 2 is a schematic diagram illustrating an N by M array of torsional bolometer units of FIG. 1, where N and M are integers.

It is expected that one will be able to read out data from such a HDTV-capable chip using a phase-locked loop and taking the signal as the deviation or "error" in the loop voltage signal. Alternatively, one could use the NEMS device as the frequency-determining element in an electronic oscillator circuit. It is expected that one can multiplex the output signals to be observed using a single transmission line for a plurality of signals of interest.

Sensing Methods
Nanomagnets

The fringe field of a nanomagnet falls off on a very short distance scale. Coupling this to a NEMS resonator enables a new displacement sensing method.

Hall Displacement Sensing

Many routes to vibrational actuation and subsequent displacement sensing can be employed. Best will be those that do not involve any use of the torsion rod so that its thermal conductance can be minimized. Electrostatic actuation is probably the most straightforward. One possible technique for transduction that scales well to nanometer dimensions is local Hall displacement sensing, for example as described in U.S. Pat. No. 6,593,731.

FIG. 3 is a diagram illustrating how one can sense single domain nanomagnets using Hall methods. The methods are explained in greater detail in F. G. Monzon, M. Johnson, and M. L. Roukes, Appl. Phys. Lett. 71, 3078 (1997),and F. G. Monzon, D. S. Patterson and M. L. Roukes, J. Mag. And Mag. Mat., 195, 19 (1999). In the bottom panel of FIG. 3 (FIG. 3A) is shown a panel in which the configuration of the Hall detector is shown. In the upper left panel of FIG. 3 (FIG. 3B) there is presented some graphical data of hysteresis curves for various configurations. In the upper right panel of FIG. 3 (FIG. 3C)there is shown an illustrative diagram depicting the fringe fields from a thin ferromagnetic film.

FIG. 4 is a diagram showing the Hall sensing geometry in greater detail. In the left panel of FIG. 4 (FIG. 4A), there is a panel showing the Hall sensing geometry in plan view. In the right panel of FIG. 4 (FIG. 4B) there is shown the Hall sensing geometry in perspective view. Above the left and right panel of FIG. 4 there are shown the Hall sensing geometry in a fabricated device in two views (a) and (b) at different magnifications.

Figure 5A:
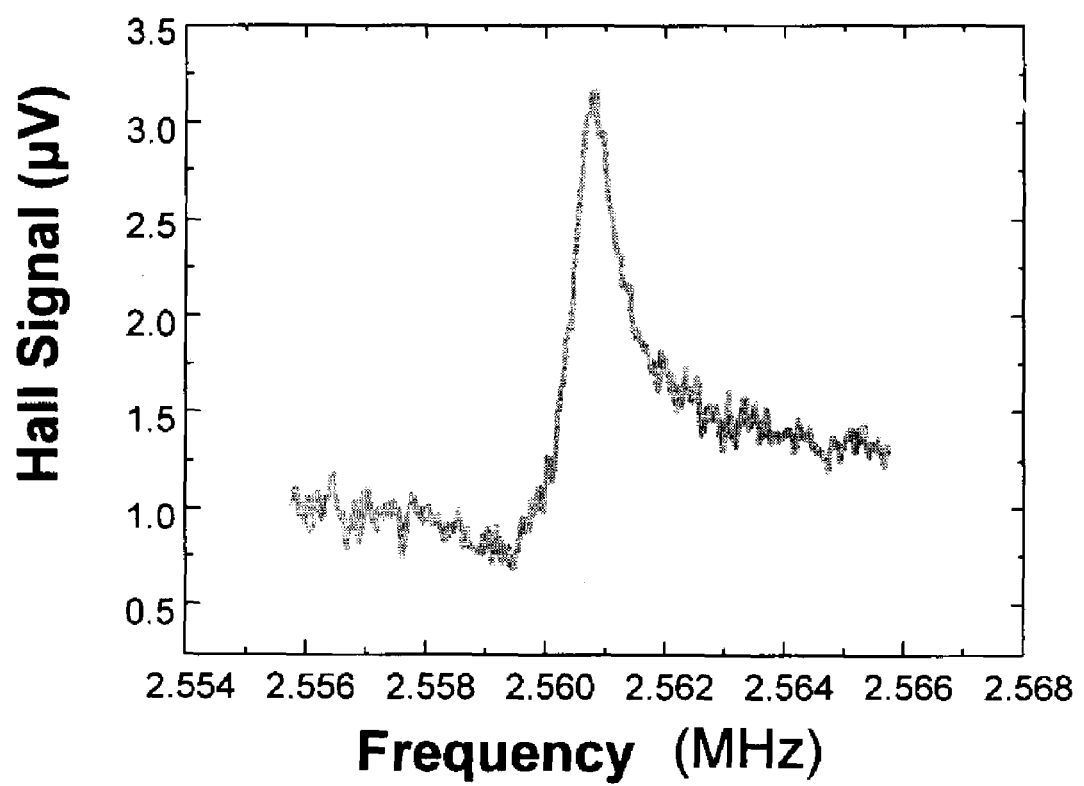
FIG. 5A is a diagram illustrating the response signal as a function of frequency for local Hall transduction.

FIG. 5A is a diagram illustrating the response signal as a function of frequency for local Hall transduction. In the observation recorded in FIG. 5A, there was used a 1 mV drive amplitude, a Hall current of 1 mA, and a preamp amplification of about 70× with a 6.8 nF capacitor.

Figure 5B:
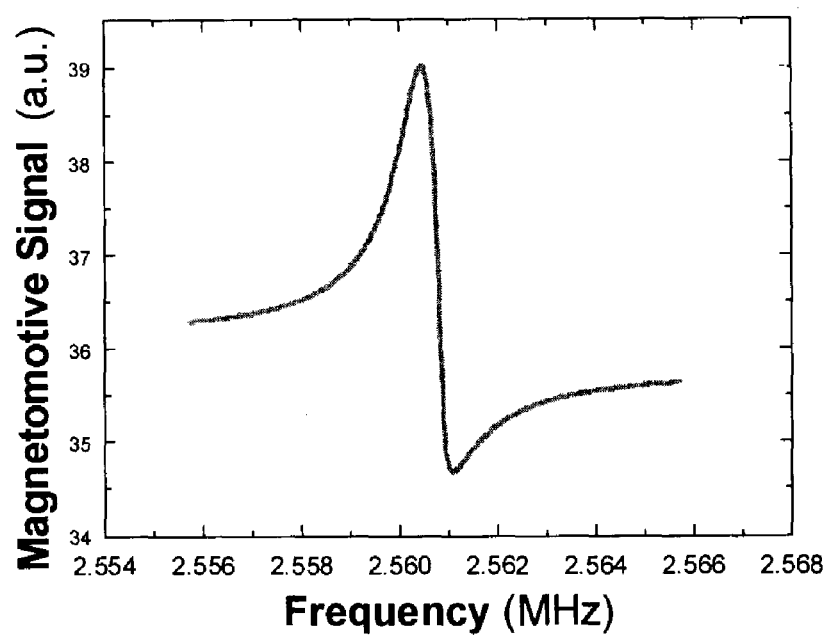
FIG. 5B is a diagram illustrating the response signal as a function of frequency for magetomotive transduction.

FIG. 5B is a diagram illustrating the response signal as a function of frequency for magetomotive transduction. In the observation recorded in FIG. 5B, there was used a 1 mV drive amplitude, a Hall current of 1 mA (DC).

In operation, a bolometer pixel according to the invention will receive incoming electromagnetic radiation, and will be heated. The change in temperature will be observable as a change in the operational characteristics of the pixel. Using a device comprising a plurality of pixels, as shown in FIG. 2 with appropriate optics, and control circuitry as may be appropriate, it should be possible in principle to obtain a thermal, or IR, image of a scene. Such a device is expected to have utility in applications such as thermal imaging, night vision, and other sensing systems that are used to detect thermal excursions, for example in maintaining operating equipment in proper thermal condition, or to detect the onset of thermal excursions such as may be caused by fire. The output from the single or plural number of sensors can be processed by any convenient computer- or microcomputer-based data processing system, and can be displayed, stored or transmitted to a remote location as may be needed. The sensor can be controlled under computer control or under the control of a user.

Another sensing approach that is expected to provide signals of interest is to bias the device pixels to a temperature above ambient using a heater and a thermal control loop. One would then read out the error signal (e.g., the signal needed to maintain constant temperature of a pixel) as data. This approach is expected to increase the dynamic range of the sensors of the invention.

It is expected that thermal excursions to lower temperatures can also be sensed, for example by observing a deviation caused by a reduction of the temperature of a pixel. Because optical losses in the vicinity of ambient temperature are small, such detection of thermal excursion may occur on a longer time scale than observations of excursions to higher temperature in response to the application of an active signal (or "forcing function").

Applications

Molecular Sensing

Nanoresonators are expected to be useful to measure changes in frequency based on changes in mass. In one embodiment, the nanoresonators are expected to be used by attaching a specific different binding material to each of N resonators, and observing which resonators change mass in the presence of a test fluid or gas so as to identify what substance might be present. As an example, an array of N resonators could each be provided with a different DNA and/or RNA moiety, and the array could be used to test for the presence of specific molecules that bind to one or more of the DNA and/or RNA moieties. The resonators that indicate a change in frequency, indicative of binding, would provide a data set to permit determination of what molecules are present in a sample that is brought in contact with the N resonator array.

It is expected that an array having a plurality of pixel can be used to detect an optical or IR signature. In this application, one binds some material to N resonators and probes each resonator with a different wavelength, e.g., a frequency comb, to see the spectral response, for example, absorption causing a change in resonance by heating, and failure to absorb resulting in no frequency change. By analyzing the N frequencies of interest, one would expect to obtain a spectral analysis in digital form.

Operation Near Thermoelastic Resonance

In one embodiment, it is contemplated to tune IR probes according to the invention to be at or near the thermoelastic resonance frequency of the devices, so as to maximize detection. This mode of operation is the antithesis of the operation of MEMS gyros that are tuned to operate at frequencies far from the thermoelastic resonance frequency, so as to avoid losses in the gyros related to thermoelastic resonance.

In the present example, expected performance has been calculated for a specific embodiment. However, using the principles of the invention, one can generalize the results of the calculation to other absorbing configurations and types of mechanical resonators (which themselves may employ a whole range of different transducers and actuators). In some embodiments, the types of electromagnetic radiation that may be detected by the present invention include gamma rays, x-rays, ultraviolet light, visible light, infrared radiation, and microwave or millimeter wave energy.

Definitions

Recording the results from an imaging operation or image acquisition, such as for example, recording results at a particular wavelength, is understood to mean and is defined herein as writing output data to a storage element, to a machine-readable storage medium, or to a storage device. Machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example an imaging or image processing algorithm coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A nanoelectromechanical sensing element, comprising:
a substrate having a surface, said substrate comprising an isotropic material, said surface having defined therein a cavity for accommodating a nanoelectromechanical structure;
a nanoelectromechanical torsional resonator having a width w and a length l, and having a torsional support connecting a first side and a second side of said nanoelectromechanical torsional resonator to said substrate, said nanoelectromechanical torsional resonator configured to receive electromagnetic radiation as a stimulus, said nanoelectromechanical torsional resonator and said torsional support configured to provide an oscillation of said nanoelectromechanical torsional resonator at a predetermined frequency; and
a displacement sensor configured to sense a displacement of said nanoelectromechanical torsional resonator relative to said substrate and configured to provide an output signal;
whereby, when said stimulus is received by said nanoelectromechanical torsional resonator, said displacement sensor provides an output signal indicative of a thermal parameter of said stimulus.

2. The nanoelectromechanical sensing element of claim 1, wherein said isotropic material is amorphous silicon.

3. The nanoelectromechanical sensing element of claim 1, wherein said width w is 10 microns and said length l is 20 microns.

4. The nanoelectromechanical sensing element of claim 1, wherein said stimulus is a thermal signal.

5. The nanoelectromechanical sensing element of claim 4, wherein said thermal signal is an infrared signal.

6. The nanoelectromechanical sensing element of claim 4, further comprising a material configured to absorb thermal radiation disposed on said nanoelectromechanical torsional resonator.

7. The nanoelectromechanical sensing element of claim 4, wherein said cavity defined in said surface of said substrate is configured to provide a quarter wave cavity.

8. The nanoelectromechanical sensing element of claim 4, wherein said cavity comprises a reflector.

9. The nanoelectromechanical sensing element of claim 4, wherein said thermal signal is a signal selected from the group consisting of gamma rays, x-rays, ultraviolet light, visible light, microwave energy and millimeter wave energy.

10. The nanoelectromechanical sensing element of claim 1, wherein said displacement sensor is a Hall displacement sensor.

11. The nanoelectromechanical sensing element of claim 1, wherein said nanoelectromechanical torsional resonator is configured to respond by providing a selected one of an optical signature and an IR signature.

12. The nanoelectromechanical sensing element of claim 11, wherein said nanoelectromechanical torsional resonator comprises a material configured to provide said selected one of an optical signature and an IR signature.

13. The nanoelectromechanical sensing element of claim 11, wherein said material configured to provide said selected one of an optical signature and an IR signature is a molecule.

14. The nanoelectromechanical sensing element of claim 1, wherein said substrate has defined therein a plurality of cavities for accommodating a nanoelectromechanical structure.

15. The nanoelectromechanical sensing element of claim 14, further comprising a first plurality of nanoelectromechanical torsional resonators, each nanoelectromechanical torsional resonator having a width w and a length l, and each having a torsional support connecting a first side and a second side of said nanoelectromechanical torsional resonator to said substrate, and a second plurality of displacement sensors, at least one of said plurality of displacement sensors configured to sense a displacement of a respective one of said plurality of nanoelectromechanical torsional resonators relative to said substrate and configured to provide an output signal indicative of a stimulus applied to said nanoelectromechanical torsional resonator.

16. The nanoelectromechanical sensing element of claim 15, wherein said first plurality is equal to the product N×M, where N and M are integers.

17. The nanoelectromechanical sensing element of claim 16, wherein said N×M nanoelectromechanical torsional resonators are configured each to receive an infrared stimulus.

18. The nanoelectromechanical sensing element of claim 16, wherein said sensing element is configured to provide as output an image.

19. The nanoelectromechanical sensing element of claim 18, wherein said image is configured in an HDTV format.

20. The nanoelectromechanical sensing element of claim 1, wherein said nanoelectromechanical sensing element is configured to operate at ambient temperature.

* * * * *